Oct. 11, 1932.  W. FAVREAU  1,881,424
ORNAMENTAL OBJECT
Filed Aug. 24, 1931  3 Sheets-Sheet 1
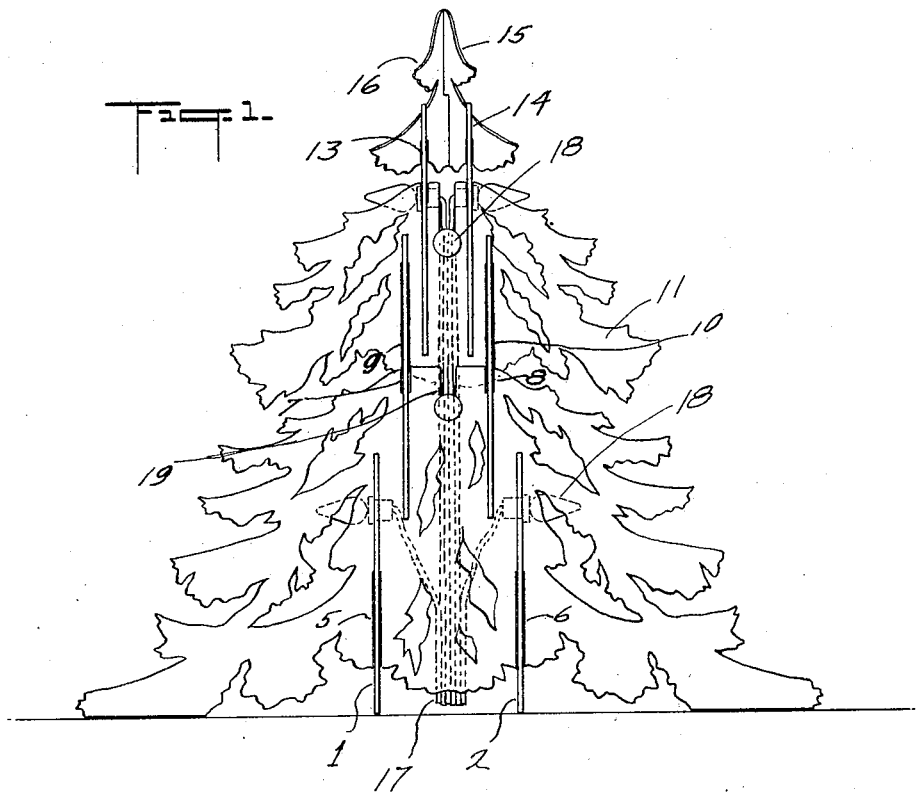
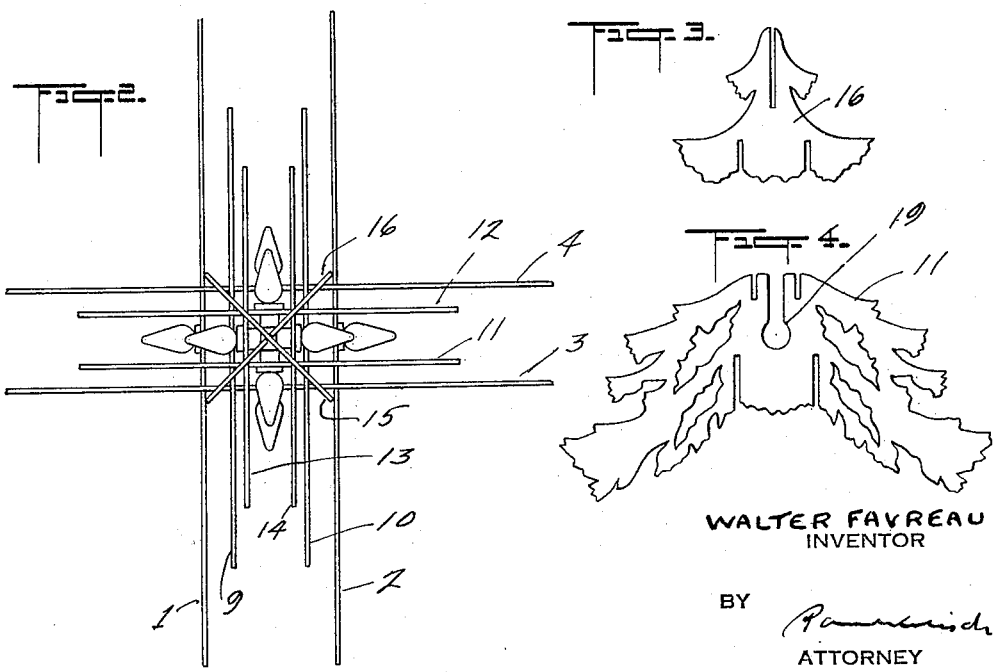
WALTER FAVREAU
INVENTOR
BY
ATTORNEY Oct. 11, 1932. W. FAVREAU 1,881,424
ORNAMENTAL OBJECT
Filed Aug. 24, 1931 3 Sheets-Sheet 2
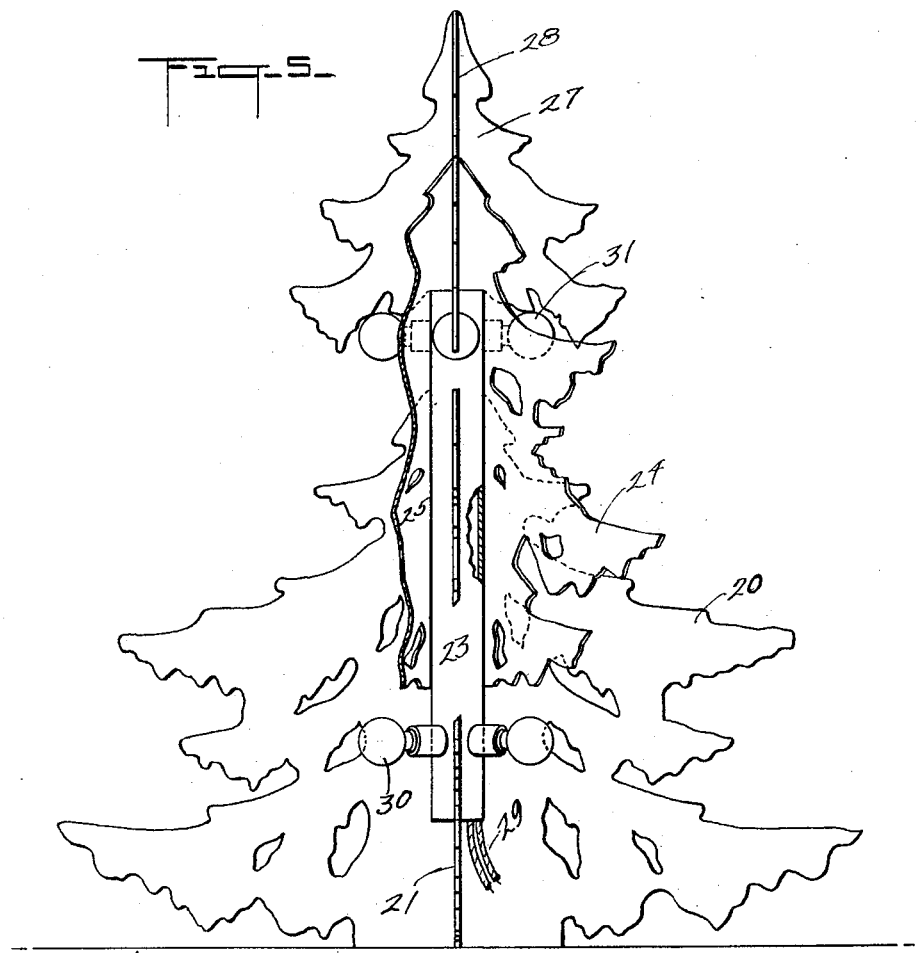
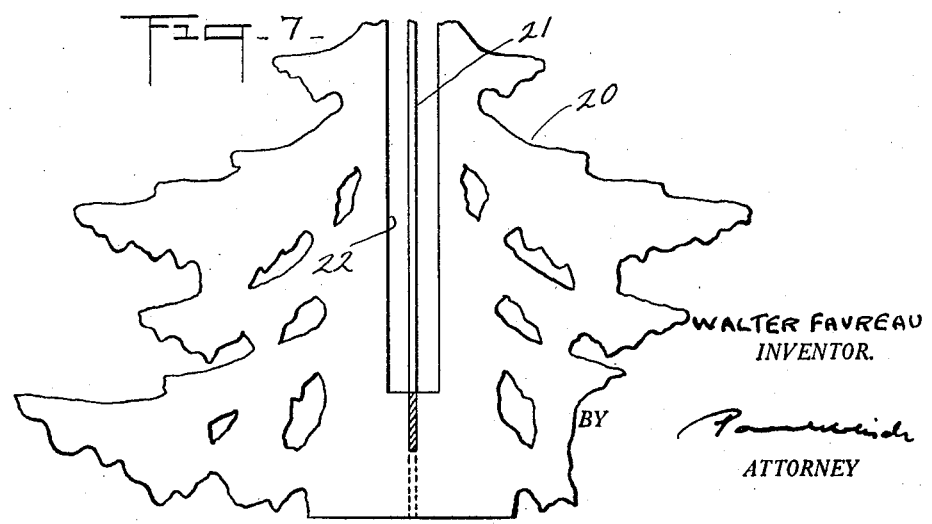
WALTER FAVREAU
INVENTOR.

Oct. 11, 1932.  W. FAVREAU  1,881,424
ORNAMENTAL OBJECT
Filed Aug. 24, 1931  3 Sheets-Sheet 3
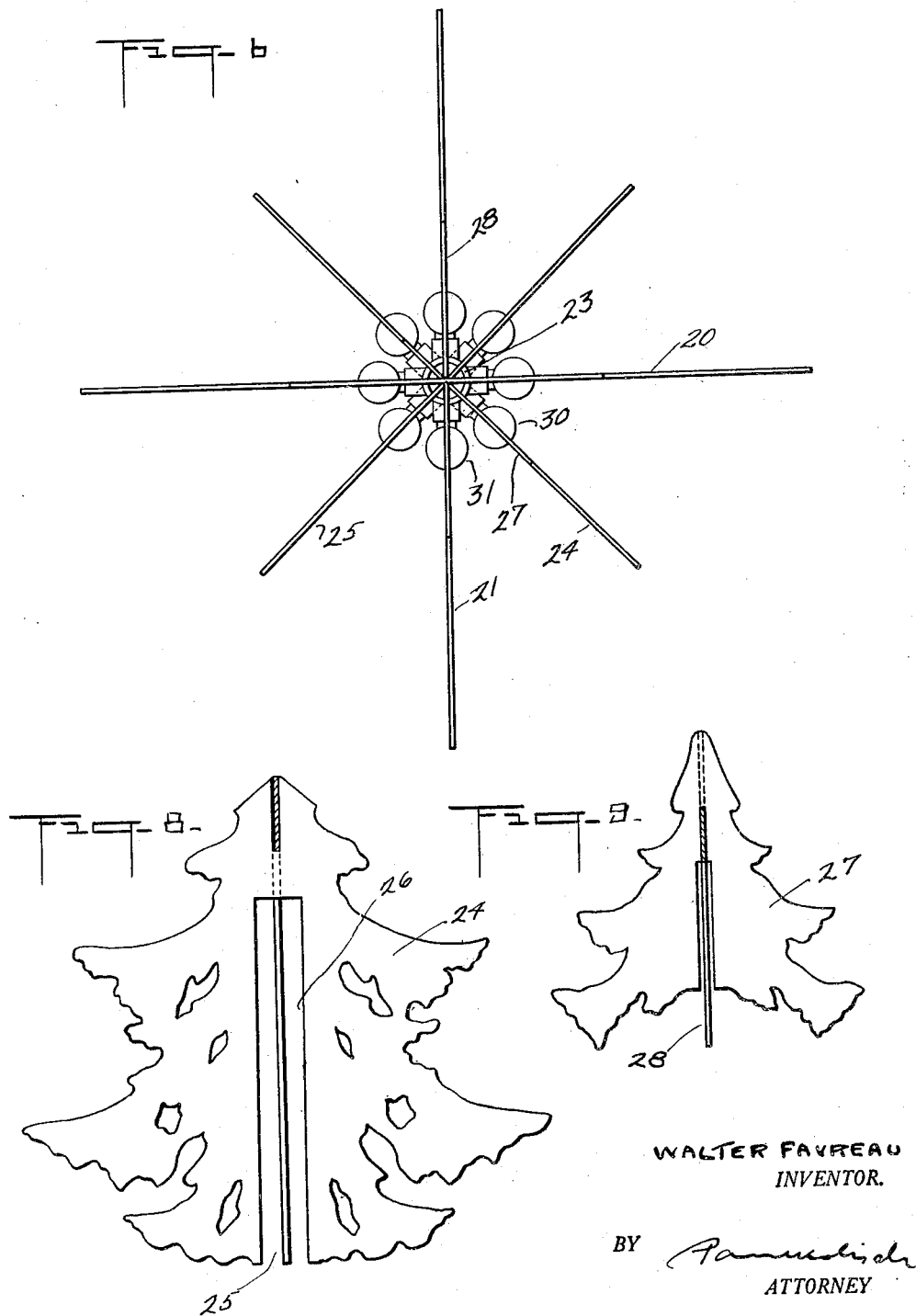
WALTER FAVREAU
INVENTOR.
BY
ATTORNEY Patented Oct. 11, 1932

1,881,424

UNITED STATES PATENT OFFICE

WALTER FAVREAU, OF TOMPKINSVILLE, NEW YORK, ASSIGNOR, BY MESNE ASSIGNMENTS, TO DESIGN LABORATORIES, INCORPORATED, OF NEW YORK, N. Y., A CORPORATION OF NEW YORK

ORNAMENTAL OBJECT

Application filed August 24, 1931. Serial No. 558,983.

This invention relates to artificial Christmas trees constructed of a plurality of sheet members cut to conform to the profile of a natural tree and provided with notches, whereby a plurality of these members may be interlocked to form a self-supporting body.

It is an object of my invention to provide a unitary self-supporting artificial structure which simulates an evergreen tree, and which is so arranged that wires may be concealed for conducting current to a plurality of lamps which are fixed to supports provided for them.

In accordance with my invention I provide a plurality of sets of profile members, each set representing a different longitudinal portion of the tree, all of the members of the set being interlocked, and the several sets being superimposed one upon another. Each set comprises a plurality of profile members placed side by side in substantially parallel relationship, with the result that when the entire structure is assembled, an opening is provided through the center of the finished structure wherein wires may be concealed for supplying energy to ornamental lamps. For holding the lamp sockets, any desired number of notches are cut out of the profile members, so that the sockets may be frictionally positioned therein. Any number of lamps may be used and the socket-receiving notches distributed to produce the desired effect. Usually eight lights are used on small trees and these may be arranged either in pairs on opposite sides of the tree, or in staggered or random position.

According to a modified form of my invention, each tree section may be constructed of a plurality of profile members intersecting at a common point, certain of these sections having cut-out pockets therein for the reception of a hollow tubular member. This tubular member or conduit not only simulates the trunk of the tree, but may also serve to conceal wires which conduct current to small lamps for ornamenting and illuminating the tree. The lamps and wires may be formed in a single unit with the tube, if desirable, so that the whole tree may be easily assembled.

The above mentioned and further objects and advantages of my invention will be more clearly explained in the following description, taken in conjunction with the accompanying drawings.

In the drawings, Fig. 1 is a side elevation view of a Christmas tree constructed in accordance with my invention;

Fig. 2 is a plan view of the tree shown in Fig. 1;

Figs. 3 and 4 are side elevation views of certain of the elements used in constructing the device of Fig. 1;

Fig. 5 is a side elevation view of a modified form of the tree;

Fig. 6 is a plan view of the tree shown in Fig. 5; and

Figs. 7, 8 and 9 are side elevation views, partly in section, of portions of the tree shown in Fig. 5.

Referring more particularly to Figs. 1 to 4, reference numerals 1 and 2 indicate, respectively, two profile members constructed of cardboard, fibre, metal or any other sheet material cut to conform to the outline of a portion of an evergreen tree. 3 and 4 are profile members similar to 1 and 2, but somewhat taller, as shown in Fig. 1. Profile members 3 and 4 have notches 5 and 6 therein which project downwardly, and members 1 and 2 have similar notches which project upwardly, whereby all of the elements 1, 2, 3, 4 may be mutually interlocked. Members 3 and 4 have at their upper edges notches 7 and 8 which serve to receive a pair of profile members 9 and 10, which are likewise notched both at the bottom and the top. The bottom notches receive the upper edges of members 3 and 4 and the upper notches receive the lower edges of two additional profile members 11 and 12. Superimposed on 11 and 12 are profile members 13 and 14 which are in turn surmounted by a pair of intersecting members 15 and 16 constituting the top of the tree. All of the pairs of members are of decreasing sizes in the order mentioned, so that when assembled, the several sets blend together to form the smooth contour profile 10 of a tree. As all of the members are assembled in parallel overlapping pairs, a box-like enclosure or conduit is formed at the center of the assembled tree, in which wires 17 may be positioned. These wires serve to conduct current to a plurality of lamps 18, the sockets of which are positioned tightly in notches 19 provided in the profile members.

In assembling the device, the two lower pairs of members 1, 2 and 3, 4 are interlocked in the proper position and the lamp sockets placed in the notches 19 provided for them. The other members are then in turn placed in position and the lamp sockets put in the notches provided for them.

The tree shown in Figs. 5 to 9, inclusive, comprises a pair of profile members 20 and 21, mutually interlocked by means of notches provided therein and cut out at their centers to form a pocket 22 for the reception of a tube or conduit 23. Superimposed upon the members 20 and 21 is a pair of somewhat smaller and overlapping profile members 24 and 25, which in turn mutually interlock by means of notches, and are cut out to provide a pocket 26, similar to 22, for the reception of the upper end of conduit 23. This pair of members 24 and 25 is arranged at an angle of 45° with respect to 20 and 21, as shown most clearly in Fig. 6.

The top of the tree is formed by a pair of intersecting members 27 and 28 which are arranged at 45° with respect to 24 and 25, and are therefore in alignment with members 20 and 21. The several sets of profile members are arranged to overlap one another vertically of the tree, so that a more natural appearance results.

The tube 23 has a plurality of wires 29 passing upwardly through the center thereof for conducting current to lamps 30 and 31, the sockets of which are held in position with respect to the tube 23, either by direct attachment or merely by the agency of the conducting wires which extend from the inside of the conduit to the sockets through a hole in the wall of the conduit.

I have shown two groups of lamps, one at the bottom and one at the top of the tube, but this arrangement is not important. The lamps might be distributed in any manner desired. The lamp arrangement shown is advantageous in certain respects, as the upper groups of lamps 31 may be positioned in the opening between profile members 20 and 27 and profile members 21 and 28, while the lamps 30 are arranged in the space between the planes of profile members 20 and 21.

The conduit 23 may be provided with conducting wires and sockets so as to form a single unit, in which case the unit may be sold individually, already wired, in conjunction with a plurality of flat sheet profile members, all of which may be shipped in a relatively small space when taken apart. The process of assembling would then be relatively easy, because it would not be necessary for the purchaser to thread wires through the tube and place the sockets in position. The wires and lamps may be omitted if desired, in which case the conduit would merely simulate the trunk of the tree. Instead of a tree, the structure might be fashioned to imitate a flower, a geometrical design, or other object.

I have described certain embodiments of my invention merely for the purposes of illustration and it should be understood that various modifications thereof may be made within the scope of the appended claims.

What I claim is:

1. An ornamental device comprising a plurality of superimposed sections each including a plurality of parallel profile members, said sections being mutually interlocked by means of slots in said members.

2. An artificial tree comprising a plurality of superimposed sections of different sizes, each consisting of a plurality of parallel profile members, said sections being mutually interlocked by means of slots in the members thereof.

3. A device in accordance with claim 2, wherein the different sections overlap longitudinally.

4. A device in accordance with claim 1, wherein lights are attached to said device and the current supply wires therefor are concealed in the opening formed between the intersecting parallel profile members.

5. A device in accordance with claim 2, wherein said superimposed sections are surmounted by a plurality of mutually intersecting profile members.

6. An artificial Christmas tree comprising a first set of mutually intersecting profile members having an upwardly extending pocket at the point of intersection thereof, a tubular member positioned in said pocket, a second set of mutually intersecting profile members having a downwardly extending pocket therein, said second set being disposed at an angle to said first set and arranged to rest on the upper end of said tubular member, said tubular member fitting within said pocket.

In testimony whereof, I have signed my name to this specification this 22nd day of August, 1931.

WALTER FAVREAU.